(No Model.)

J. & A. F. MOSER.
ADJUSTABLE HARROW TRUCK.

No. 426,195. Patented Apr. 22, 1890.

Witnesses:
William Wm. Sonne
Albert Bigler

Inventor:
Jacob Moser
Albert F. Moser

UNITED STATES PATENT OFFICE.

JACOB MOSER AND ALBERT F. MOSER, OF SIGEL, ILLINOIS.

ADJUSTABLE HARROW-TRUCK.

SPECIFICATION forming part of Letters Patent No. 426,195, dated April 22, 1890.

Application filed December 6, 1889. Serial No. 332,863. (No model.)

*To all whom it may concern:*

Be it known that we, JACOB MOSER and ALBERT F. MOSER, citizens of the United States, residing at Sigel, in the county of Shelby and State of Illinois, have invented a new and useful Adjustable Harrow-Truck, of which the following is a specification.

The objects of our invention are, first, to provide a light, simple, and durable harrow-truck which is adjustable to any harrow and by means of which the harrow or any part thereof may be raised and lowered for the purpose of cleaning it with perfect ease and safety while in motion, and, second, to afford facilities for raising the harrow from the ground for transportation, thereby obviating the necessity of overturning it.

The following is a description of our invention, reference being had to the accompanying drawings, in which—

Figure 1:
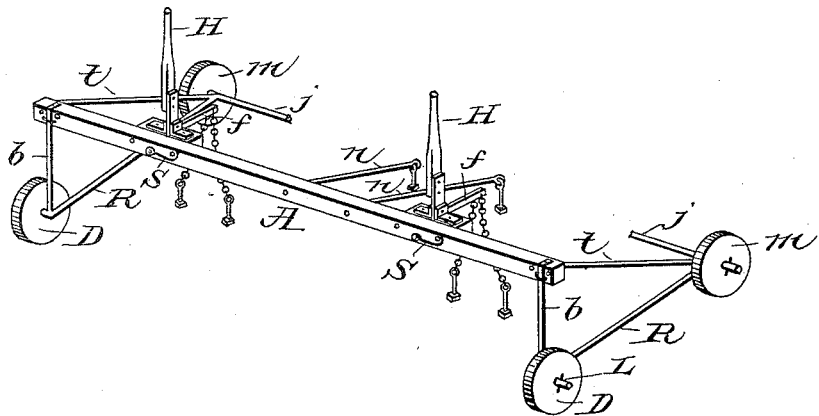
Figure 2:
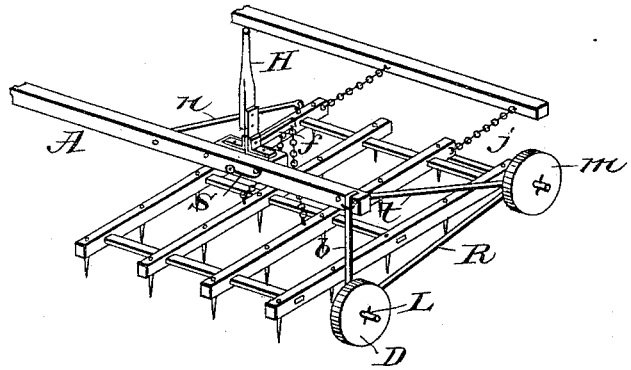

Figure 1 is a perspective view of the entire device; and Fig. 2, a detail view in perspective of the truck, showing its connection with the harrow.

A is the beam. The standards $b\ b$ are rigidly attached to the ends of beam A (rear side) and are bent at their lower ends to form axles L L for the rear wheels D D. The stay-rods $t\ t$ are also rigidly attached to the ends of beam A (front side) and their opposite ends bent to form rings for the reception of the forward axle $j$, said stay-rods inclining from the beam A to a point horizontal with the axles L L. The connecting-rods R R are bent at their ends in such a manner as to form rings, one ring being for the reception of the rear axle L and the other the forward axle $j$.

The forward axles $j\ j$ are secured to the under side of the tooth-bars by means of bolts (see Fig. 2) near the front of the harrow and serve as hinges for the truck, as well as axles for the forward wheels $m\ m$. The brace-rods $n\ n$, being jointed at their ends and secured in the manner shown in Fig. 2, allow the harrows free play vertically, yet keep them parallel to the beam A.

The levers H H are hinged at their lower ends and are provided with arms $f f$, projecting at right angles to the levers. To the extreme forward end of each arm $f$ are secured two chains, the opposite ends of said chains being bolted to the two inside tooth-bars of the harrow, as shown in drawings. The harrow is raised and lowered by means of the lever H, said lever being so adjusted that it rests on the beam A when in its horizontal position, thereby rendering it an easy matter after the rear part of the harrow is raised to rock the truck on the rear wheels. When found that raising the rear part of the harrow is not sufficient to allow all trash and weeds to pass out, the fore part may also be raised by rocking the truck.

The forward wheels $m\ m$ are used only when the harrow is being transported to prevent the fore part from dragging too heavily, the rear part being raised and retained in that position by passing the hook $s$ over the lever H. By extracting the key in the end of the axle $j$ said wheels $m\ m$ may be removed without difficulty and in like manner replaced.

The truck, as shown in Fig. 1, is suitable for harrow consisting of two parts, but may be provided with one or more levers, &c., to correspond with any number of parts of which the harrow may consist. If the harrow consists of but one part, the brace-rods $n\ n$ are dispensed with.

What we claim, and desire to secure by Letters Patent, is—

The combination, in a harrow-truck, of the beam A, the standards $b\ b$, attached to and depending from said beam A and bent at their lower ends to form axles, the inclined stay-rods $t\ t$, the connecting-rods R R, the brace-rods $n\ n$, the forward axles $j\ j$, the four wheels, and suitable levers for raising the harrows, all substantially as set forth and described.

JACOB MOSER.
ALBERT F. MOSER.

Witnesses:
ALBERT BIGLER,
JAMES T. BUTCHER.